United States Patent
Ishiguro

(10) Patent No.: US 7,810,970 B2
(45) Date of Patent: Oct. 12, 2010

(54) METHOD AND APPARATUS FOR CONTROLLING SWIVEL ANGLE OF ON-VEHICLE HEADLIGHT

(75) Inventor: Koji Ishiguro, Toyoake (JP)

(73) Assignee: Denso Corporation, Kariya (JP)

( * ) Notice: Subject to any disclaimer, the term of this patent is extended or adjusted under 35 U.S.C. 154(b) by 231 days.

(21) Appl. No.: 12/002,283

(22) Filed: Dec. 14, 2007

(65) Prior Publication Data

US 2008/0239735 A1 Oct. 2, 2008

(30) Foreign Application Priority Data

Dec. 15, 2006 (JP) .............................. 2006-338510

(51) Int. Cl.
*F21V 1/00* (2006.01)
(52) U.S. Cl. .................. 362/466; 362/43; 362/464; 362/465; 362/487; 362/525
(58) Field of Classification Search ................. 362/43, 362/464–466, 525, 487
See application file for complete search history.

(56) References Cited

U.S. PATENT DOCUMENTS

2006/0028832 A1* 2/2006 Horii et al. .................. 362/514

FOREIGN PATENT DOCUMENTS

JP 2004-51043 2/2004

* cited by examiner

*Primary Examiner*—Sandra L O'Shea
*Assistant Examiner*—Meghan K Dunwiddie
(74) *Attorney, Agent, or Firm*—Harness, Dickey & Pierce, PLC

(57) ABSTRACT

In the vehicle lighting control apparatus and method, it is determined that the user's steering wheel is returned from a steering angle existing in a saturated steering angle region toward a neutral steering angle region at a given speed or more. If such a steering condition is found, a swivel angle is calculated based on a swivel-angle control characteristic showing a monotonic decrease in the swivel angle when the steering angle decreases from the steering angle existing in the saturated steering angle range to a third preset angle. The third preset angle is an angle from which the swivel angle decreasing from the steering angle existing in the saturated steering range becomes zero. This calculated swivel angle is used to control the swivel angle of light irradiated from on-vehicle headlights.

14 Claims, 4 Drawing Sheets

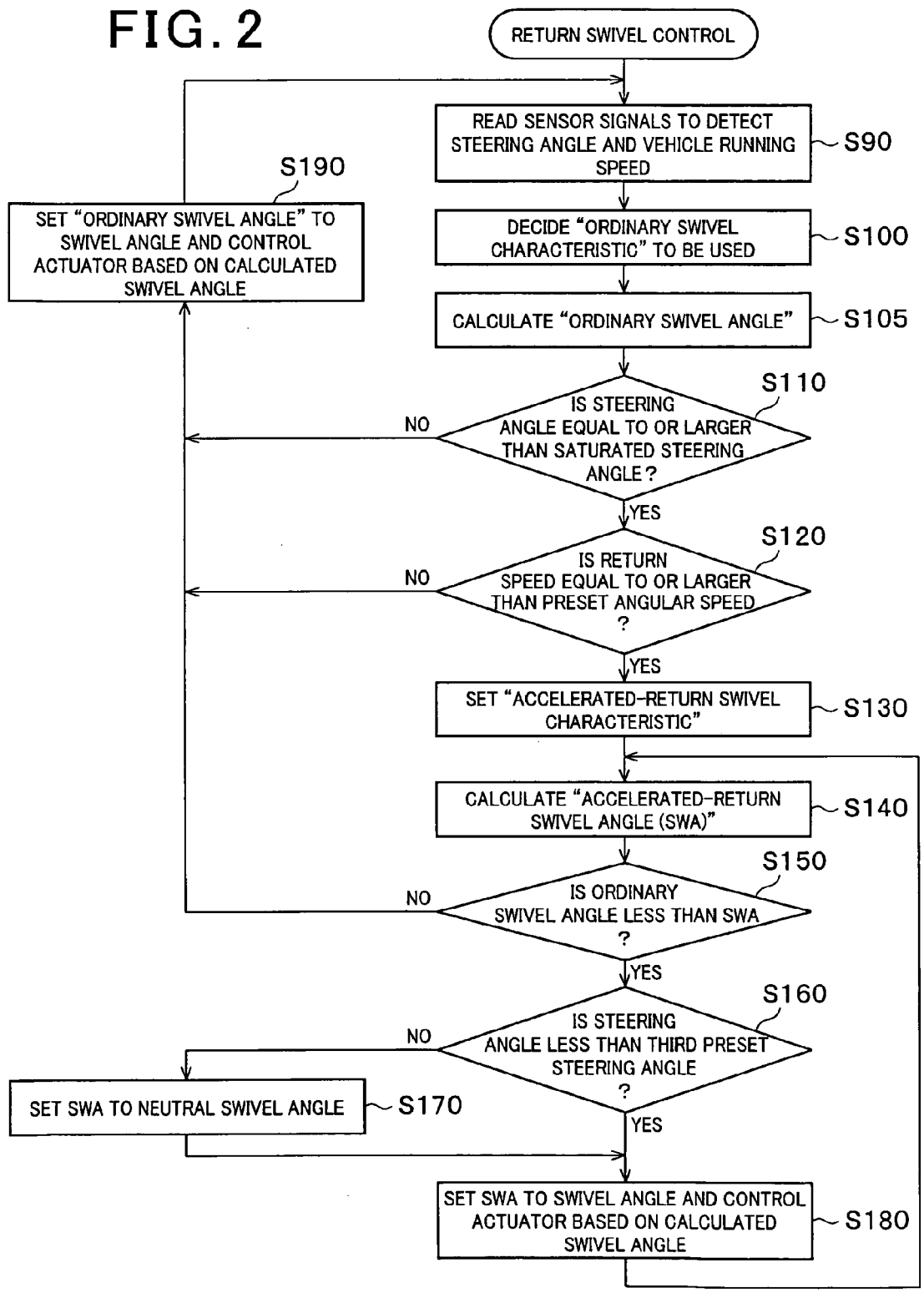

METHOD AND APPARATUS FOR CONTROLLING SWIVEL ANGLE OF ON-VEHICLE HEADLIGHT

CROSS-REFERENCE TO RELATED APPLICATION

This application is based on and claims the benefit of priority from earlier Japanese Patent Application No. 2006-338510 filed Dec. 15, 2006, the description of which is incorporated herein by reference.

BACKGROUND OF THE INVENTION

1. Field of the Invention

The present invention relates to a method and apparatus for controlling a swivel angle of headlights of a vehicle.

2. Description of the Related Art

A variable light distribution front-lighting system (referred to as an adaptive front-lighting system [AFS]) including a headlight and a controlling device is conventionally known. The headlight is configured such that an optical axis of the headlight (in other words, an irradiating direction of irradiation light) can be turned within an angular range in a vehicle width direction. The angular range is preset in advance. The controlling device performs swivel control to turn the optical axis of the headlight in the vehicle width direction in accordance with a steering angle of a vehicle (in other words, changes the irradiating direction). Hereinafter, an angle of the irradiating direction to a direct advance direction is referred to as a swivel angle. The irradiating direction is the direction in which the irradiation light is irradiated. The direct advance direction is a direction in which the vehicle is traveling straight. A maximum swivel angle by which the optical axis can be turned is referred to as a saturated angle.

In this type of AFS, as shown in FIG. 5A, when a steering angle exceeds a first preset steering angle ($\alpha 1$ in FIG. 5A), preset in advance, as a result of a steering wheel being turned, the swivel angle increases in accordance with the steering angle. When the steering angle exceeds a second preset steering angle ($\alpha 2$ in FIG. 5A) which is preset in advance, the swivel angle is maintained at a saturated angle. When the steering wheel starts to return from a steering angle at which the swivel angle is saturated ($\alpha 3$ in FIG. 5A; referred to, hereinafter, as a saturated steering angle) to a steering angle at which the vehicle travels straight (referred to, hereinafter, as a neutral steering angle), the swivel angle is maintained at the saturated angle until the steering angle is at the second preset steering angle. When the steering angle becomes less than the second preset steering angle, the swivel angle decreases in accordance with the steering angle such that the optical axis of the headlight is in the direct advance direction of the vehicle when the steering angle is at the first preset steering angle (this swivel angle is referred to, hereinafter, as a neutral swivel angle). Hereinafter, a swivel control performed when the steering wheel is returned from the saturated steering angle to the neutral steering angle is referred to as a "return swivel control."

However, when a return swivel control such as that described above is performed, the swivel angle does not immediately change when a driver steers the steering wheel to return the steering wheel. Therefore, the driver experiences inconvenience because the return of the headlight is slower than the steering operation.

Thus, a following return swivel control is proposed (refer to, for example, Japanese Patent Application Publication (Laid-open) No. 2004-51043). As shown in FIG. 5B, when the steering wheel starts to return from the saturated steering angle to the neutral steering angle, the swivel angle decreases in accordance with the decrease in the steering angle such that the swivel angle is at the neutral swivel angle when the steering angle is at a third preset steering angle ($\alpha 4$ in FIG. 5B) which is greater than the first preset steering angle ($\alpha 1$ in FIG. 5B), without the swivel angle being maintained at the saturated angle.

In other words, in the AFS described in Japanese Patent Laid-open Publication No. 2004-51043, the return swivel control is performed using a swivel angle that is uniquely determined in accordance with a steering angle at the time of when the steering wheel starts to return (more accurately, the saturated angle at the time of when the steering wheel starts to return) and the third preset steering angle, based on a swivel relationship in which the steering angle and the swivel angle are associated in advance (this return swivel control is referred to, hereinafter, as a specified swivel control).

Among the AFS, an AFS exists in which the return swivel control is performed as follows (this swivel control is referred to as an "ordinary swivel control"). Upon the first preset steering angle and the second preset steering angle being changed based on a speed of an own vehicle, the swivel angle is maintained at the saturated angle until the steering angle is at the second preset angle. When the steering angle is less than the second preset angle, the swivel angle becomes the neutral swivel angle when the steering angle is at the first preset steering angle.

When the specified swivel control described in Japanese Patent Laid-open Publication No. 2004-51043 is applied to an AFS such as that described above, when the steering wheel starts to return from the saturated steering angle to the neutral steering angle, the swivel angle becomes closer to the neutral swivel angle in accordance with the steering operation. Therefore, the possibility of the driver experiencing inconvenience caused by a delay in the return of the irradiating direction of the headlight and the like can be reduced.

However, after the steering wheel returns from the saturated angle by a certain amount, the swivel angle may return to the neutral swivel angle more quickly when the ordinary swivel control is used to control the swivel angle, compared to when the swivel angle is controlled by the specified swivel control. A swivel control matching the senses of the driver may not be performed.

In other words, in the conventional AFS, when the steering wheel starts to return from the saturated steering angle to the neutral steering angle, a swivel control matching the senses of the driver can be performed. However, after the steering wheel returns from the saturated angle by a certain amount, the swivel control matching the senses of the driver may not be performed.

SUMMARY OF THE INVENTION

An object of the present invention is to provide a vehicle lighting control apparatus that can perform swivel control matching the senses of a driver when a steering wheel returns from a saturated steering angle to a neutral steering angle.

To achieve the above-described object, the present invention provides, as one aspect, an apparatus for controlling a swivel angle of light irradiated ahead from a headlight mounted on a vehicle, based on a steering angle given to a driver's steering wheel mounted on the vehicle, the apparatus comprising: steering angle acquiring means that acquires the steering angle of the driver's steering wheel; operation determining means for determining whether or not the steering wheel is in a predetermined operation-return state in which the steering wheel is returned from a steering angle existing in a saturated steering angle region relative to the swivel angle toward a neutral steering angle region relative to the swivel angle at an angular speed more than a preset value; first calculating means that calculates a first swivel angle based on a first type of swivel-angle control characteristic showing a monotonic change in the swivel angle when the steering angle changes between a first preset angle to a second preset angle, the first preset angle being a reference steering angle from which the swivel angle starts to increase as the steering angle increases, the second present angle being a reference steering angle from which the swivel angle starts to be saturated when the steering angle increases; second calculating means that calculates a second swivel angle based on a second type of swivel-angle control characteristic showing a monotonic decrease in the swivel angle when the steering angle decreases from the steering angle existing in the saturated steering angle range to a third preset angle, when operation determining means determines that the steering wheel is in a predetermined operation-return state, the third preset angle being a reference steering angle at which the steering angle decreasing from the steering angle existing in the saturated steering range starts to become zero; comparing means that compares the first swivel angle and the second swivel angle as to whether or not the second swivel angle is smaller than the first swivel angle; deciding means that decides the second swivel angle as a swivel angle to be controlled, when the comparing means shows that the second swivel angle is smaller than the first swivel angle; and controlling means that controls the swivel angle of the light irradiated ahead from the headlight mounted on the vehicle, based on the swivel angle decided by the deicing means.

In the controlling apparatus of the invention, the irradiating angle is not maintained at a limit irradiating angle immediately after the steering angle starts to return. Therefore, the irradiating angle can start to return to the neutral irradiating angle in accordance with the decrease in the steering angle without delaying from a steering operation performed by the driver.

Thus, in the invention, even when, for example, the own vehicle is traveling through a switching point at which a curved road switches to a straight road, a direction in which the irradiation light is irradiated can be transitioned onto the straight road at an appropriate timing in accordance with a traveling state of the vehicle.

BRIEF DESCRIPTION OF THE DRAWINGS

In the accompanying drawings:

FIG. 2 is a flowchart of procedures in a return swivel control process;

DETAILED DESCRIPTION OF THE PREFERRED EMBODIMENTS

Exemplary embodiments of the present invention will now be described with reference to the attached drawings.

Figure 1A:
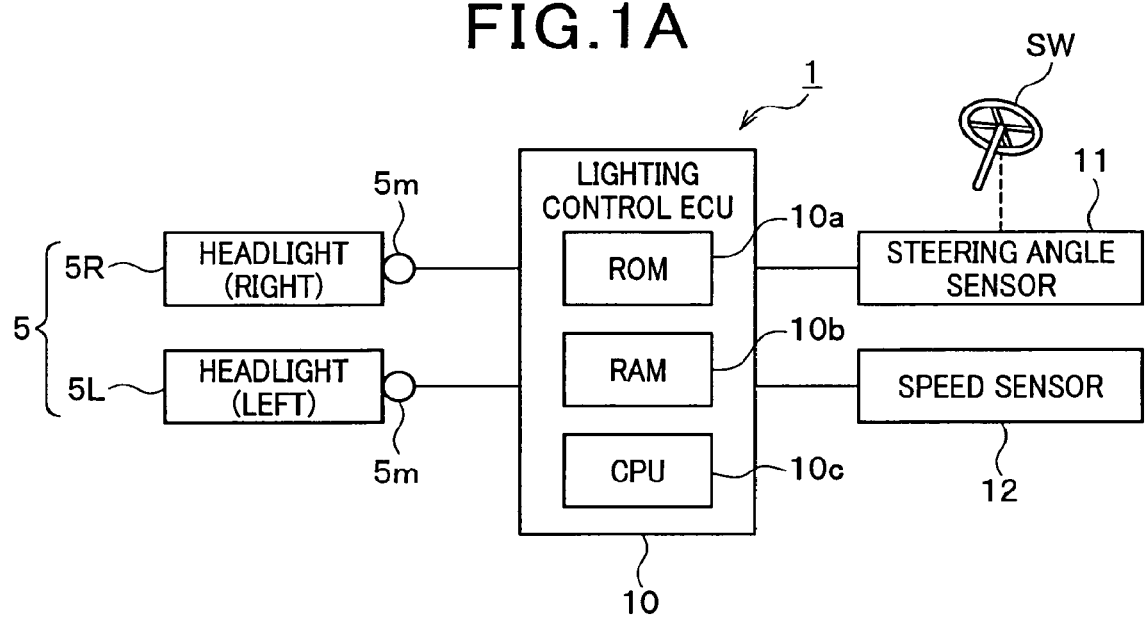
FIG. 1A is a block diagram of an overall configuration of a variable light-distribution front-lighting system.

FIG. 1A is a block diagram of an overall configuration of a vehicle lighting control apparatus mounted on a vehicle, to which the present invention is applied.

Hereinafter, the vehicle on which the vehicle lighting control apparatus is mounted is referred to as an "own vehicle."

A vehicle lighting control apparatus 1 includes headlights 5, a steering angle sensor 11, a speed sensor 12, and a lighting control electronic control unit (ECU) 10. The headlights 5 are used to irradiate irradiation light onto the front of the own vehicle. The steering angle sensor 11 detects a steering angle of the own vehicle and an angular speed of a steering wheel during a driver's steering operation. The speed sensor 12 detects a speed of the own vehicle. The lighting control ECU 10 controls the headlights 5 based on detection results from the steering angle sensor 11 and the speed sensor 12.

Figure 1B:
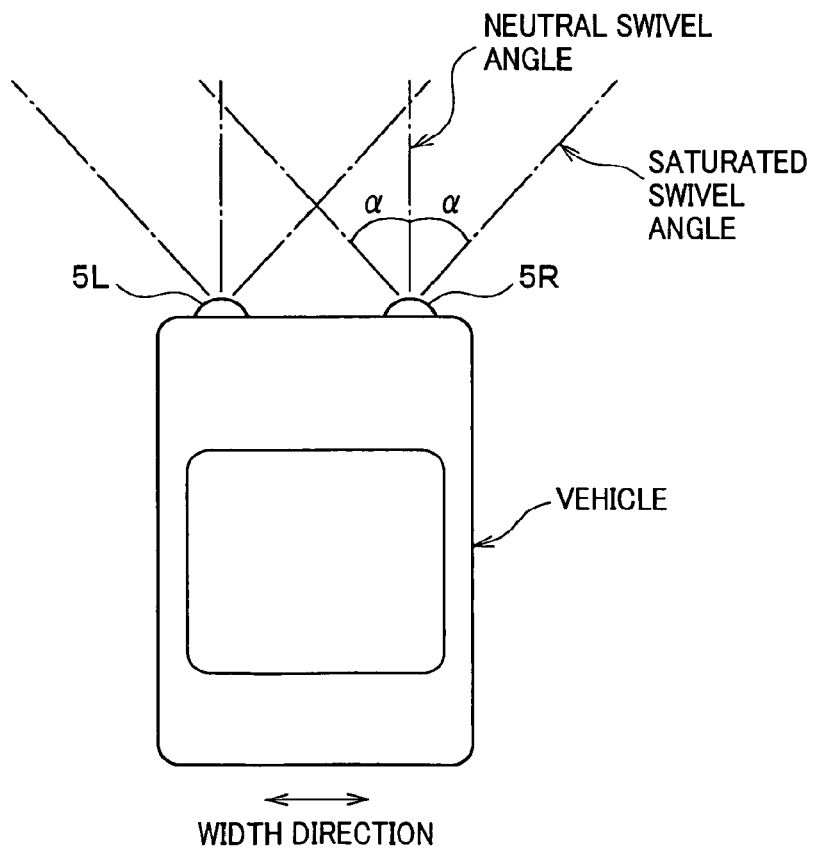
FIG. 1B explains swivel angles of light irradiated from a headlight.

The headlights 5 are composed of a plurality of light sources (two light sources according to the embodiment) aligned in a vehicle width direction (refer to FIG. 1B). The headlights 5 are disposed on a front part of the vehicle and are used as headlights (the light source of the headlight on the left-hand side is referred to, hereinafter, as a headlight 5L; the light source of the headlight on the right-hand side is referred to, hereinafter, as a headlight 5R).

Each of the left and right headlights 5L and 5R is connected with an actuator 5m. The actuator 5m adjusts an angle of an optical axis in a vehicle height direction (in other words, low beam or high beam) and an angle of the optical axis to a straight running direction of the own vehicle (referred to, hereinafter, as a swivel angle; refer to FIG. 1B). In other words, in response to reception of the operation signal from the lighting control ECU 10, the actuator 5m can turn each headlight 5L (5R) to change the optical axis of light irradiated therefrom in the vehicle width direction.

The steering angle sensor 11 detects the steering angle of the steering wheel SW of the own vehicle at given sampling intervals set in advance. The steering angle sensor 11 outputs the angular speed and the steering angle at each time of sampling to the lighting control ECU 10. The angular speed and the steering angle are collectively referred to as steering angle information. The angular speed indicates an amount of steering performed during a driver's steering operation.

The speed sensor 12 detects the speed of the own vehicle from an amount of tire rotation. The speed sensor 12 then outputs the speed to the lighting control ECU 10.

The lighting control ECU 10 is configured mainly by a microcomputer including a read-only memory (ROM 10a), a random-access memory (RAM 10b), and a central processing unit (CPU) 10c. The ROM 10a stores a program for performing various processes, a swivel angle map, and the like. In the swivel angle map, the speed and the steering angle of the own vehicle are associated with the swivel angle. The RAM 10b temporarily stores data. The CPU 10 performs a process in accordance with the program stored in the ROM 10a.

When the steering angle increases in a right-hand direction (in other words, when the own vehicle is making a right turn), the lighting control ECU 10 according to the embodiment outputs an operation signal to the actuator 5m such that the optical axes of both the headlight 5L and the headlight 5R turn right. When the steering angle increases in a left-hand direction (in other words, when the own vehicle is making a left turn), the lighting control ECU 10 outputs an operation signal to the actuator such that the optical axes of both the headlight 5L and the headlight 5R turn left.

In other words, the light control ECU 10 decides the swivel angle depending on the speed and the steering angle of the own vehicle. The lighting control ECU 10 performs a return swivel control to turns the optical axes of the headlights 5 such that the irradiation light is irradiated at the decided swivel angle.

In this way, the vehicle lighting control apparatus is used as a so-called variable light-distribution front-lighting system (in other words, an AFS). The irradiating direction of the irradiation light is controlled by the optical, axes of the headlights 5 being turned in the vehicle width direction.

Next, the swivel angle map stored in the ROM 10a will now be described.

Figure 3:
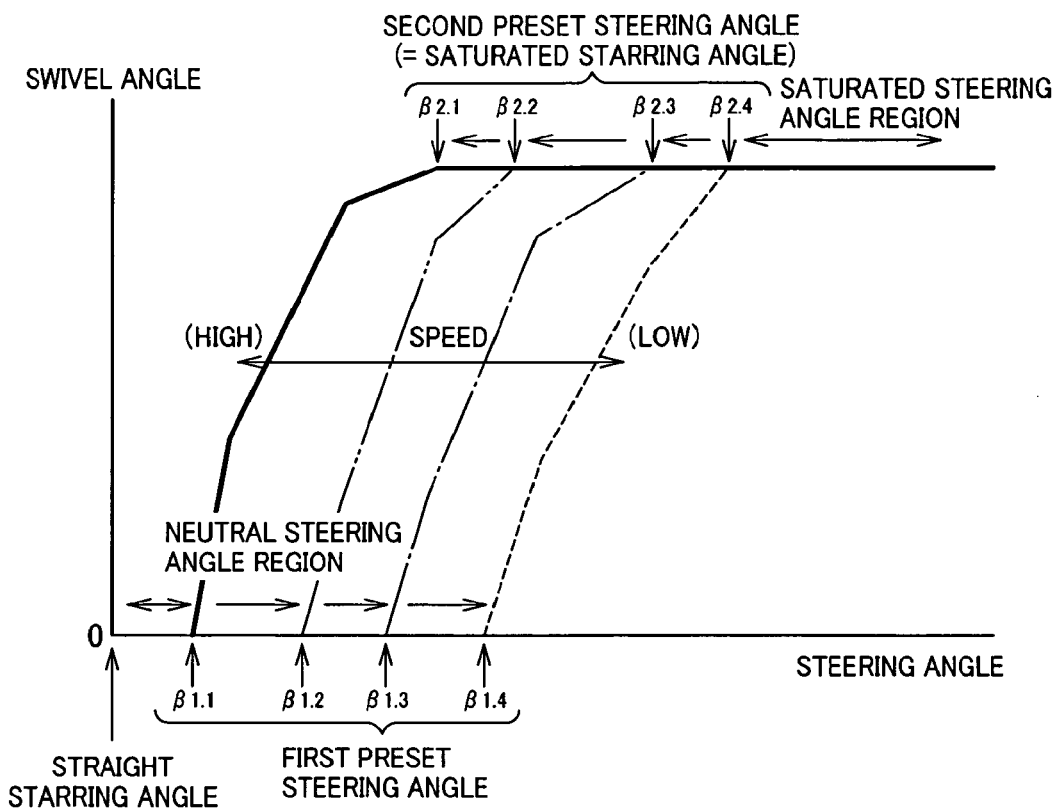
FIG. 3 is an explanatory diagram of an outline of a swivel angle map.

FIG. 3 is an explanatory diagram (graph) explaining an outline of the swivel angle map.

In the swivel angle map, the speed and the steering angle of the own vehicle are associated with the swivel angle, such that the direction in which the irradiation light is irradiated matches the senses of the driver when the steering wheel is operated such that the steering angle increases (in other words, when the own vehicle moves such as to approach a curve from a straight section). The speed and the steering angle of the own vehicle are associated with the swivel angle based on results obtained through experiments and the like.

Hereafter, a swivel angle at which the optical axes of the headlights 5 matches a front direction of the own vehicle is referred to as a "neutral swivel angle" (refer to FIG. 1B). A swivel angle at which the optical axes of the headlights 5 are positioned at a movable limit is referred to as a "saturated swivel angle" (refer to FIG. 1B). A steering angle at which the own vehicle is traveling straight is referred to as a "straight steering angle." A steering angle preset in advance at which the swivel angle begins to change in accordance with a driver's steering operation in which the steering angle increases from the straight steering angle is referred to as a "first preset steering angle." A swivel angle preset in advance at which the swivel angle becomes the saturated swivel angle in accordance with a driver's steering operation in which the steering angle increases from the first preset steering angle is referred to as a "second preset steering angle."

Specifically, as shown in FIG. 3, the steering angle and the swivel angle are associated in the swivel angle map such that the swivel angle is maintained at the neutral swivel angle when the steering angle is between the straight steering angle and the first preset steering angle ($\beta_{1,1}$ in FIG. 3), even when the steering angle increases from the straight steering angle to the first preset steering angle.

The steering angle and the swivel angle are also associated in the swivel angle map such that the swivel angle increases in accordance with the increase in the steering angle (in other words, a monotonically increasing relationship is formed between the steering angle and the swivel angle) between the first preset steering angle and the second preset steering angle ($\beta_{2,1}$ in FIG. 3).

Furthermore, the steering angle and the swivel angle are associated in the swivel angle map such that the swivel angle is maintained at the saturated swivel angle when the steering angle is at the second preset steering angle or more, even when the steering angle increases from the second preset steering angle.

Hereinafter, a relationship between the steering angle and the swivel angle associated in the swivel angle map between the first preset steering angle and a saturated steering angle when the second preset steering angle is the saturated steering angle is referred to as an "ordinary swivel characteristic (i.e., a first type of swivel-angle control characteristic)."

However, in the swivel angle map, a plurality of first preset steering angles and saturated steering angles are provided such that the first preset steering angle ($\beta_{1,2}, \beta_{1,3}, \beta_{2,4}$ in FIG. 3) and the saturated steering angle ($\beta_{2,2}, \beta_{2,3}, \beta_{2,4}$ in FIG. 3) increases when the speed of the own vehicle decreases. In other words, a plurality of ordinary swivel characteristics are provided in accordance with the speed of the own vehicle. The swivel angle between the first preset steering angle and the saturated steering angle is also determined in accordance with the ordinary swivel characteristics, which are based on the speed.

[Swivel Control Process]

Next, the process for swivel control including the return swivel control, which is performed by the lighting control ECU 10, will now be described.

FIG. 2 is a flowchart of procedures in the swivel control process carried by the ECU 1. The swivel control process starts when the headlights 5 are irradiated.

When the swivel control process starts, at step S90, the ECU 10 reads electrical signals from the steering angle sensor 11 and the speed sensor 12 to detect a current steering angle given to the steering wheel SW by a driver and a current running speed of the vehicle, respectively.

Then at step S100, the ECU 10 uses the detected vehicle running speed to decide which ordinary swivel characteristic to be used among the various characteristics stored in the swivel angle map shown in FIG. 3.

The process then proceeds to step S105, where the decided ordinary swivel characteristic and the detected current steering angle are used to calculate an ordinary swivel angle. By way of example, applying the value of the steering angle to the curve of one decided ordinary swivel characteristic (refer to FIG. 3) makes it possible to calculate the value of an ordinary swivel angle to be targeted by the swivel angle control.

At step S110, the ECU 10 uses the detected current steering angle to determine whether or not the current steering angle is equal to or more than the saturated steering angle, based on both the decided ordinary swivel characteristic and the detected steering angle. When the determination shows that the steering angle is equal to or more than the saturated angle, the process proceeds to step S120.

At step S120, a steering direction of the steering wheel is detected based on the steering angle information detected by the steering angle sensor 11. Whether the steering direction of the steering wheel is a direction in which the steering wheel is returned (in other words, a direction in which the steering wheel is steered from the steering angle which is the saturated angle or more to the direct advance angle) and the angular speed is a preset angular speed preset in advance or more are judged. When the determination shows that the steering wheel is returned from the steering angle equal to or more than the saturated angle to the straight steering angle and the angular speed is equal to or more than the preset angular speed, the process proceeds to step S130.

At step S130, an accelerated-return swivel characteristic (i.e., a second type of swivel-angle control characteristic) is set to allow the swivel angle to decrease with a decrease in the steering angle between a return-start steering angle and a "third preset steering angle." The swivel characteristic is set based on a steering angle at which the steering angle that has exceeded the saturated angle starts to decrease (in other words, when the steering wheel starts to return; this steering angle is referred to, hereinafter, as a "return-start steering angle") and the third preset steering angle. This third angle is a steering angle preset in advance, at which the swivel angle becomes the neutral swivel angle in accordance with the driver's steering operation in which the steering angle decreases from the return-start steering angle.

In other words, in the swivel characteristic, the steering angle and the swivel angle are associated such that the steering angle and the swivel angle monotonically decrease between the return-start steering angle, which is a maximum steering angle during the steering operation, and the third preset steering angle, when the steering wheel at a steering angle exceeding the saturated steering angle is returned at a speed that is the preset angular speed or more.

At subsequent step S140, a swivel angle is calculated from the swivel characteristic, in accordance with the steering angle detected by the steering angle sensor 11 (the swivel angle calculated from the swivel characteristic is referred to, hereinafter, as an "accelerated-return swivel angle [SWA]"). The process proceeds to step S150.

Specifically, the accelerated-return swivel angle is calculated by Expression (1) when the saturated swivel angle is α, the steering angle is STRA, the return-start steering angle is STRB, and the third preset steering angle is β.

$$SWA=\alpha((STRA-\beta)/(STRB-\beta)) \quad (1)$$

At step S150, the swivel angle is calculated in accordance with the steering angle detected by the steering angle sensor 11, based on the ordinary swivel characteristic decided at step S100 (the swivel angle calculated from the ordinary swivel characteristic is referred to, hereinafter, as an "ordinary swivel angle").

Furthermore, at step S150, a value of the accelerated-return swivel angle calculated at step S130 and a value of the ordinary swivel angle calculated at step S105 are compared. When the comparison result is that the value of the accelerated-return swivel angle is smaller, or in other words, when the accelerated-return swivel angle is judged to be closer to the neutral swivel angle than the ordinary swivel angle, the process proceeds to step S160.

At step S160, whether the steering angle detected by the steering angle sensor 11 is between the straight steering angle and the third preset steering angle is judged. When, as a result of the judgment, the steering angle is judged to be between the straight steering angle and the third steering angle, the process proceeds to step S170.

At step S170, the accelerated-return swivel angle is set as the neutral swivel angle. The process then proceeds to step S180.

The process proceeds to step S180 even when, as a result of the judgment at step S160, the steering angle detected by the steering angle sensor 11 is not an angle between the straight steering angle and the third preset steering angle.

At step S180, a drive signal is transmitted to the actuator such that the irradiation light is irradiated at the accelerated-return swivel angle. The actuator that has received the drive signal turns the optical axis such that the angle in the vehicle width direction to the direct advance direction of the vehicle is the accelerated-return swivel angle.

Subsequently, the process returns to step S140.

At the same time, when, as a result of the judgment at step S110, the steering angle is judged to be less than the saturated steering angle based on the ordinary swivel characteristics or, as a result of the judgment at step S120, the steering wheel is not returned from the steering angle that is the saturated steering angle or more to the direct advance angle or the angular speed detected by the steering angle sensor 11 is less than the preset angular speed, the process proceeds to step S190. In other words, when the steering wheel is not steered in the direction in which the steering wheel is returned or, even when the steering wheel is steered to return the steering wheel, when the swivel angle is not required to be made closer to the neutral swivel angle more quickly, such as when the steering wheel is returned from a steering angle less than the saturated angle or when the steering wheel is returned at an angular speed lower than the preset angular speed, the process proceeds to step S190.

When, as a result of the judgment at step S150, the accelerated-return swivel angle is greater than the ordinary swivel angle (in other words, when the ordinary swivel angle is closer to the neutral swivel angle), the process proceeds to step S190.

At step S190, the ordinary swivel angle is determined in accordance with the steering angle detected by the steering angle sensor 11, based on the ordinary swivel characteristic decided at step S100. The drive signal is transmitted to the actuator such that the irradiation light is irradiated at the ordinary swivel angle. The actuator that has received the drive signal turns the optical axis such that the angle in the vehicle width direction to the direct advance direction of the vehicle is at the ordinary swivel angle.

Subsequently, the process returns to step S100.

The swivel control process is completed when the headlights 5 are turned off.

Figure 4:
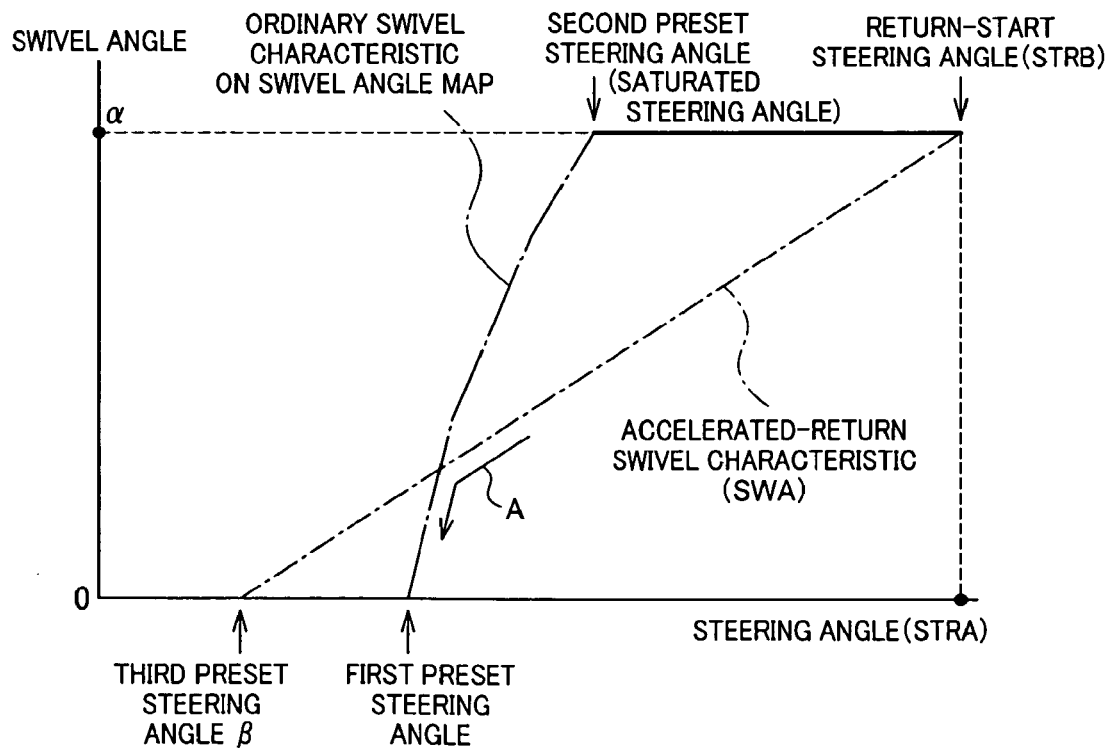
FIG. 4 is an explanatory diagram of an outline of a return swivel control process in the variable light-distribution front-lighting system.
Figure 5A:
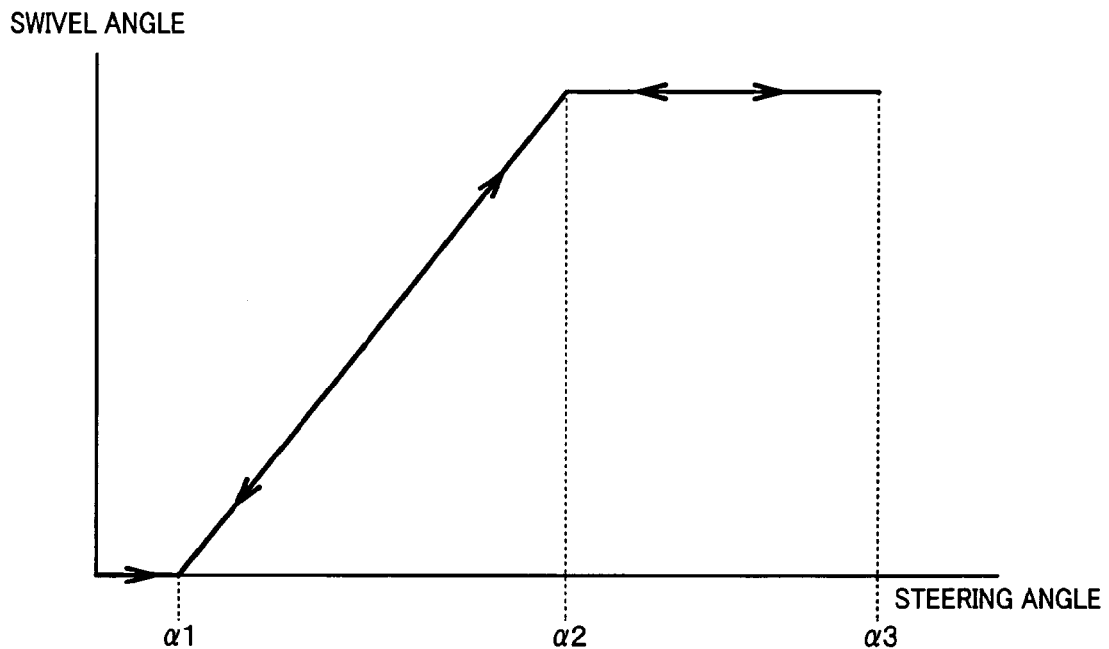
FIGS. 5A and 5B are explanatory diagrams that outline swivel control in a conventional variable light-distribution front-lighting system.
Figure 5B:
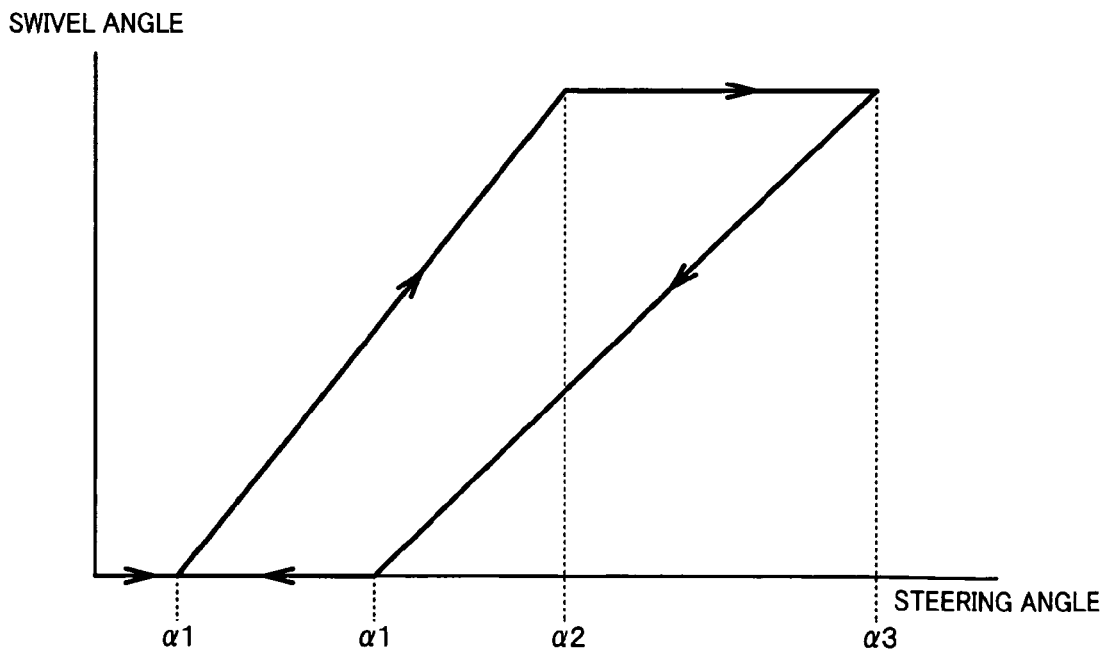

FIG. 4 is an explanatory diagram of an outline of the swivel control including the return swivel control.

As shown in FIG. 4, in the swivel control process according to the embodiment, when the steering angle increases from the straight steering angle, the swivel angle is maintained at the neutral swivel angle that is the ordinary swivel angle determined in accordance with the swivel angle map until the steering angle reaches the first preset steering angle, decided by the speed of the own vehicle, from the straight steering angle. From the first preset steering angle to the saturated steering angle, based on the ordinary swivel characteristic decided based on the speed of the own vehicle, the swivel angle that is at the ordinary swivel angle increases in accordance with the steering angle. When the steering angle exceeds the saturated steering angle decided by the speed of the own vehicle and increases, the swivel angle is maintained at the saturated swivel angle.

In other words, in the swivel control process, when the steering angle increases from the straight steering angle, the optical axes of the headlights 5 are controlled such that the irradiation light is irradiated at the ordinary swivel angle determined in accordance with the swivel angle map.

At the same time, in the return process of the swivel control, when the steering wheel is returned from the return-start steering angle such that the steering angle decreases at a speed that is the preset angular speed or more, the swivel characteristic is set between the return-start steering angle and the third preset steering angle. When the steering wheel starts to return (in other words, when the steering angle is near the return-start steering angle), the optical axes of the headlights 5 are controlled such that the irradiation light is irradiated at the accelerated-return swivel angle determined in accordance with the steering angle from the swivel characteristic.

In the return swivel control process, when the steering wheel is returned until the steering angle is less than the saturated steering angle, the ordinary steering angle determined based on the ordinary swivel characteristic and the accelerated-return swivel angle are compared. The optical axes of the headlights 5 are controlled using the smaller value between the ordinary swivel angle and the accelerated-return swivel angle.

Therefore, in the return swivel control process, if an ordinary swivel angle less than the accelerated-return swivel angle determined from the swivel characteristic is not present (in other words, when the third preset steering angle is greater than the first preset steering angle decided based on the speed of the own vehicle), the optical axes of the headlights 5 are controlled such that the irradiation light is irradiated only at the accelerated-return swivel angle.

In the return swivel control, if the ordinary swivel angle is less than the accelerated-return swivel angle (in other words, when the third preset steering angle is less than the first preset steering angle decided on the vehicle speed), the optical axes of the headlights 5 are controlled to switch to irradiation of the light at the ordinary swivel angle. Usually this irradiation switch is performed when the steering angle returns toward the neutral swivel angle range by a certain amount of angle. In FIG. 4, such an irradiation switch corresponds to an intersecting point where the accelerated-return swivel characteristic and the ordinary swivel characteristic (refer to an arrow "A").

Effects According to the Embodiment

As described above, in the vehicle lighting control apparatus 1 according to the embodiment, the swivel angle is not maintained at the saturated swivel angle immediately after the steering wheel starts to return from the return-start steering angle to the straight steering angle at a speed that is the preset angular speed or more. Therefore, the swivel angle can start returning to the neutral swivel angle without delay from the steering wheel steering operation performed by the driver.

As a result, in the vehicle lighting control apparatus 1, when the driver performs steering to return the steering wheel, the driver can be prevented from experiencing inconvenience because the swivel angle does not change or the like occurs.

Furthermore, in the vehicle lighting control apparatus 1 according to the embodiment, when the third preset steering angle is greater than the first preset steering angle, the optical axes of the headlights 5 are controlled such that the irradiation light is irradiated only at the accelerated-return swivel angle. Therefore, the swivel angle can be returned to the neutral swivel angle most quickly, in accordance with the speed of the own vehicle.

In the vehicle lighting control apparatus 1, when the third preset steering angle is smaller than the first preset steering angle, the optical axes of the headlights 5 are controlled such that the irradiation light is irradiated at the ordinary swivel angle. Therefore, the swivel angle can return to the neutral swivel angle more quickly. As a result, in the vehicle lighting control apparatus 1, the irradiation light can be irradiated at a swivel angle matching the senses of the driver, even after the steering wheel is returned such that the steering angle decreases by a certain amount from the return-start steering angle.

Therefore, in the vehicle lighting control apparatus 1, for example, even when the own vehicle is traveling through a switching point at which a curved road switches to a straight road, the direction in which the irradiation light is irradiated can be transitioned to the straight road at an appropriate timing in accordance with a traveling state of the own vehicle. Therefore, a desire of the driver that the straight road be visually recognizable as quickly as possible when the own vehicle is traveling through the switching point can be satisfied.

Other Embodiments

Various other embodiments according to the present invention are possible.

For example, the third preset steering angle according to the embodiment is preset in advance. However, the third preset steering angle can be changed in accordance with the running speed of the own vehicle. In this case, the steering angle is preferably set such that the swivel angle is at the neutral swivel angle when the steering angle is greater (in other words, the steering angle is near the return-start steering angle) when the speed of the own vehicle is high. The ECU 10 is able to perform this control of the third preset steering angle at step S130 depending on the vehicle running speed detected at step S90 in FIG. 2.

When the third preset steering angle is set as described above, the swivel angle can return to the neutral swivel angle more quickly. In particular, when the own vehicle is traveling through the switching point where the curved road switches to the straight road and the speed of the own vehicle is high, the desire of the driver that the straight road be visually recognizable as quickly as possible can be satisfied.

The ordinary swivel angle in the vehicle lighting control apparatus 1 according to the embodiment is decided based on the ordinary swivel characteristic, after the ordinary swivel characteristic is decided based on the speed. However, the ordinary swivel angle can be uniquely decided in accordance with the speed and the steering angle at the time of when the swivel angle is determined. The ordinary swivel angle is calculated in accordance with the swivel angle map stored in the ROM 10a. However, the ordinary swivel angle can be calculated in accordance with an expression preset in advance or a table associating the steering angle and the speed with the swivel angle.

According to the above-described embodiment, the optical axes of both the headlight 5L and the headlight 5R are turned to match the turning direction of the own vehicle. However, only the headlight 5R (5L) can be turned to the right (left) when the own vehicle makes a right (left) turn.

It should be appreciated that the present invention is not limited to the embodiments described above, and various changes may be made within the spirit and the scope of the present invention.

What is claimed is:

1. An apparatus for controlling a swivel angle of light emitted ahead from a headlight mounted on a vehicle, based on a steering angle of a driver's steering wheel mounted on the vehicle, the apparatus comprising:
   means for acquiring the steering angle of the driver's steering wheel;
   means for determining whether or not the steering wheel is in a predetermined driver's operation state in which the steering wheel is returning from a steering angle existing in a saturated steering angle range given to the swivel angle toward a neutral steering angle range given to the swivel angle at an angular speed greater than a preset angular speed;
   means for calculating a first swivel angle based on a first type of swivel-angle control characteristic showing a monotonic change in the swivel angle when the steering angle changes between a first preset angle to a second preset angle, the first preset angle being a reference steering angle from which the swivel angle starts to increase as the steering angle increases, the second preset angle being a reference steering angle from which the swivel angle starts to be saturated when the steering angle increases;

means for calculating a second swivel angle based on a second type of swivel-angle control characteristic showing a monotonic decrease in the swivel angle when the steering angle decreases from the steering angle existing in the saturated steering angle range to a third preset angle, when the determining means determines that the steering wheel is in the predetermined driver's operation state, the third preset angle being a reference steering angle at which the steering angle decreasing from the steering angle existing in the saturated steering range starts to become zero;

means for comparing the first swivel angle and the second swivel angle as to whether or not the second swivel angle is smaller than the first swivel angle;

means for deciding the second swivel angle as a swivel angle to be controlled, when the comparing means shows that the second swivel angle is smaller than the first swivel angle; and means for controlling the swivel angle of the light emitted ahead from the headlight mounted on the vehicle, based on the swivel angle decided by the deciding means.

2. The apparatus of claim 1, further comprising
means for acquiring a speed of the vehicle; and
means for changing the third preset angle depending based on the speed of the vehicle detected by the speed acquiring means.

3. The apparatus of claim 2, wherein
the means for calculating the first swivel angle comprises means for changing the first type of swivel-angle control characteristic depending on the speed of the vehicle.

4. The apparatus of claim 2, further comprising:
means for controlling the swivel angle of the light emitted ahead from the headlight mounted on the vehicle, based on the first swivel angle calculated by the means for calculating the first swivel angle.

5. The apparatus of claim 4, wherein
the means for calculating the first swivel angle comprises means for changing the first type of swivel-angle control characteristic depending on the speed of the vehicle.

6. A method of controlling a swivel angle of light emitted ahead from a headlight mounted on a vehicle, based on a steering angle of a driver's steering wheel mounted the vehicle, the method comprising:

acquiring the steering angle of the driver's steering wheel;

determining whether or not the steering wheel is in a predetermined driver's operation state in which the steering wheel is returning from a steering angle existing in a saturated steering angle range given to the swivel angle toward a neutral steering angle range given to the swivel angle at an angular speed greater than a preset angular speed;

calculating a first swivel angle based on a first type of swivel-angle control characteristic showing a monotonic change in the swivel angle when the steering angle changes between a first preset angle to a second preset angle, the first preset angle being a reference steering angle from which the swivel angle starts to increase as the steering angle increases, the second preset angle being a reference steering angle from which the swivel angle starts to be saturated when the steering angle increases;

calculating a second swivel angle based on a second type of swivel-angle control characteristic showing a monotonic decrease in the swivel angle when the steering angle decreases from the steering angle existing in the saturated steering angle range to a third preset angle, when it is determined that the steering wheel is in a predetermined driver's operation state, the third preset angle being a reference steering angle at which the steering angle decreasing from the steering angle existing in the saturated steering range starts to become zero;

comparing the first swivel angle and the second swivel angle as to whether or not the second swivel angle is smaller than the first swivel angle;

deciding the second swivel angle as a swivel angle to be controlled, when it is compared that the second swivel angle is smaller than the first swivel angle; and controlling the swivel angle of the light emitted ahead from the headlight mounted on the vehicle, based on the swivel angle decided.

7. The apparatus of claim 1, wherein the second type of swivel-angle control characteristic is defined by a linear line which corresponds to the monotonic decrease between the swivel angle and the steering angle.

8. The apparatus of claim 7, wherein the linear line of the second type of swivel-angle control characteristic is set to intersect a line which regulates the monotonic change between the swivel angle and the steering angle.

9. The apparatus of claim 8, further comprising:
means for acquiring a speed of the vehicle; and
means for changing the third preset angle depending on the speed of the vehicle detected by the speed acquiring means.

10. The apparatus of claim 9, wherein
the means for calculating the first swivel angle comprises means for changing the first type of swivel-angle control characteristic depending on the speed of the vehicle.

11. The apparatus of claim 9, further comprising:
means for controlling the swivel angle of the light emitted ahead from the headlight mounted on the vehicle, based on the first swivel angle calculated by the means for calculating the first swivel angle.

12. The apparatus of claim 11, wherein:
the means for calculating the first swivel angle comprises means for changing the first type of swivel-angle control characteristic depending on the speed of the vehicle.

13. The method of claim 6, wherein the second type of swivel-angle control characteristic is defined by a linear line which corresponds to the monotonic decrease between the swivel angle and the steering angle.

14. The method of claim 13, wherein the linear line of the second type of swivel-angle control characteristic is set to intersect a line which regulates the monotonic change between the swivel angle and the steering angle.

* * * * *

UNITED STATES PATENT AND TRADEMARK OFFICE
CERTIFICATE OF CORRECTION

PATENT NO.       : 7,810,970 B2                                         Page 1 of 1
APPLICATION NO.  : 12/002283
DATED            : October 12, 2010
INVENTOR(S)      : Koji Ishiguro It is certified that error appears in the above-identified patent and that said Letters Patent is hereby corrected as shown below:

Col. 11, line 24, claim 2, delete "depending"

Signed and Sealed this
Twenty-second Day of February, 2011

David J. Kappos
*Director of the United States Patent and Trademark Office*